United States Patent
Canfield

(10) Patent No.: US 7,304,567 B2
(45) Date of Patent: Dec. 4, 2007

(54) METHOD AND APPARATUS FOR COMMUNICATING CONTROL AND OTHER INFORMATION OVER A POWER BUS

(75) Inventor: Eric L. Canfield, Chester Springs, PA (US)

(73) Assignee: nth Solutions, LLC, West Chester, PA (US)

( * ) Notice: Subject to any disclaimer, the term of this patent is extended or adjusted under 35 U.S.C. 154(b) by 112 days.

(21) Appl. No.: 11/060,590

(22) Filed: Feb. 18, 2005

(65) Prior Publication Data

US 2006/0187015 A1   Aug. 24, 2006

(51) Int. Cl.
*B60Q 1/00* (2006.01)

(52) U.S. Cl. ............. 340/438; 307/10.1; 340/310.12; 340/538.11

(58) Field of Classification Search ........ 340/438, 340/439, 384.4, 426.1, 426.13, 426.14, 474, 340/310.11, 310.12, 310.13, 538.11, 538, 340/538.12; 307/9.1, 3, 10.1; 315/276
See application file for complete search history.

(56) References Cited

U.S. PATENT DOCUMENTS

| | | | |
|---|---|---|---|
| 4,300,126 A | 11/1981 | Gajjar | |
| 4,328,590 A | 5/1982 | Lee | |
| 4,479,215 A | 10/1984 | Baker | |
| 4,489,420 A | 12/1984 | Baker et al. | |
| 4,642,607 A | 2/1987 | Strom et al. | |
| 4,652,855 A | 3/1987 | Weikel | |
| 4,661,718 A | 4/1987 | Matsumoto et al. | |
| 4,935,736 A | 6/1990 | Meierdierck | |

(Continued)

FOREIGN PATENT DOCUMENTS

| JP | 7050619 A | 1/1995 |
|---|---|---|
| JP | 2004274156 | 9/2004 |

OTHER PUBLICATIONS

Press Release, Valeo: Global Automotive Supplier, "Valco Unveils Powerful Line Technology With High Potential—Future Vehicle Networks Simplified," Paris France (Oct. 7, 2002).

(Continued)

*Primary Examiner*—Brent A. Swarthout
(74) *Attorney, Agent, or Firm*—Nixon & Vanderhye PC

(57) ABSTRACT

An information signal to be communicated to a roof-mounted light bar or other electrical or electronic device travels over the vehicle's or other environment's power bus or other power conductor. In one exemplary illustrative non-limiting implementation, a modulated current load draws power supply current in an amount that is instantaneously responsive to at least some characteristic of the information signal to be communicated. This modulated current loading induces the vehicular or other power supply (e.g., DC battery) to modulate its output voltage in a manner that is responsive to the modulated current loading. A voltage sensor and demodulator also connected to the power bus senses the resulting voltage fluctuations and demodulates those fluctuations to recover or regenerate the original information signal. The recovered information signal may be used for any purpose including but not limited to controlling aspects of the operation of an emergency vehicle light bar or other audible and/or visual warning system or other device. The data sender and data receiver can be co-located to provide a full duplex or half duplex powerline communicated transceiver.

26 Claims, 13 Drawing Sheets

U.S. PATENT DOCUMENTS

| | | | |
|---|---|---|---|
| 5,029,271 | A | 7/1991 | Meierdierck |
| 5,142,278 | A | 8/1992 | Moallemi et al. |
| 5,406,249 | A | 4/1995 | Pettus |
| 5,422,623 | A | 6/1995 | Bader et al. |
| 5,818,127 | A | 10/1998 | Abraham |
| 5,856,776 | A | 1/1999 | Armstrong et al. |
| 6,130,487 | A * | 10/2000 | Bertalan et al. ............. 307/9.1 |
| 6,140,914 | A * | 10/2000 | Mueller et al. ........ 340/426.13 |
| 6,161,066 | A | 12/2000 | Wright et al. |
| 6,188,181 | B1 | 2/2001 | Sinha et al. |
| 6,188,314 | B1 * | 2/2001 | Wallace et al. ............. 340/438 |
| 6,188,939 | B1 | 2/2001 | Morgan et al. |
| 6,208,086 | B1 * | 3/2001 | Nerone ...................... 315/276 |
| 6,288,631 | B1 | 9/2001 | Shinozaki et al. |
| 6,373,375 | B1 | 4/2002 | Hoetzel et al. |
| 6,563,419 | B1 | 5/2003 | Herz et al. |
| 6,694,439 | B2 | 2/2004 | Cho et al. |
| 6,704,346 | B1 | 3/2004 | Mansfield |
| 6,778,078 | B1 | 8/2004 | Han et al. |
| 6,865,460 | B2 | 3/2005 | Bray et al. |
| 7,173,959 | B2 | 2/2007 | Kaku |
| 2001/0034573 | A1 | 10/2001 | Morgan et al. |
| 2002/0171291 | A1 * | 11/2002 | Wayne et al. ................ 307/9.1 |
| 2003/0080619 | A1 | 5/2003 | Bray et al. |
| 2004/0036594 | A1 | 2/2004 | Ladow et al. |
| 2005/0011389 | A1 | 1/2005 | Teowee et al. |

OTHER PUBLICATIONS

Aschenbrenner, Stephan, Exida.com, FMEA Assessment, Project: Intrinsic Safety Isolators HiD 2026SK, HiD 2030SK and HiD, 14 pages (Feb. 23, 2001).

PRNewswire, "Mitsubishi Materials Selects TI's PurePath Digital™ Technology for Power Line Communication (PLC) Wireless Audio Module," Dallas, TX (Mar. 25, 2003).

Buso, Simone, "Comparision of Current Control Techniques for Active Filter Applications," IEEE Transactions on Industrial Electronics, vol. 45, No. 5, pp. 722-729 (Oct. 1998).

Data Sheet, "Vibration 262-101, CV 210 + IVC 632, Vibro-meter, Velocity Transducer System for Low-Frequency Measurements," Fribourg, Switzerland, 4 pages, (May 27, 2005).

Data Sheets, Code 3 Public Safety Equipment, Inc., 13 pages, (Feb. 2, 2005).

* cited by examiner

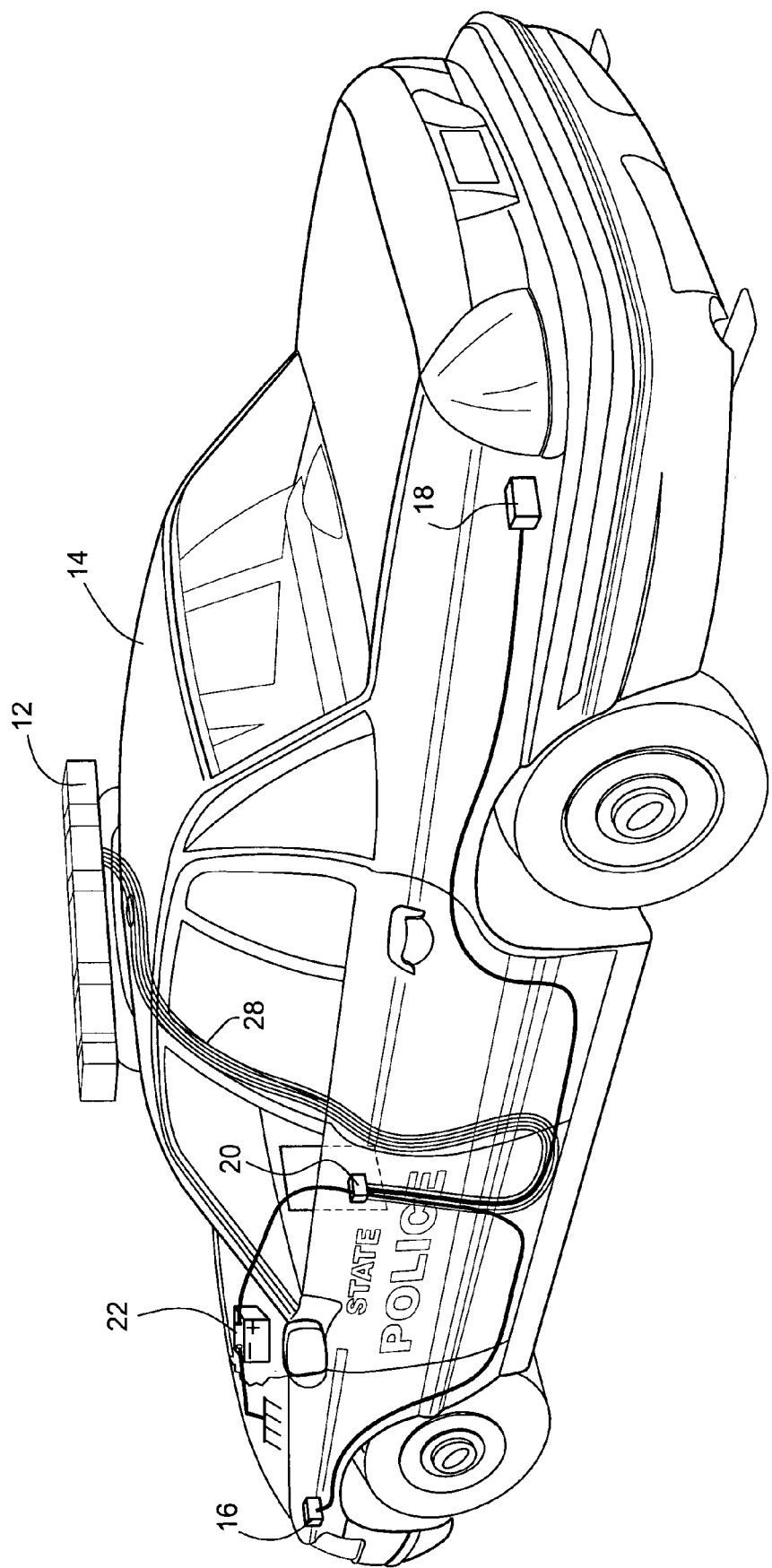
Fig. 1 MULTI-CONDUCTOR POWER HARNESS DESIGN
(PRIOR ART)

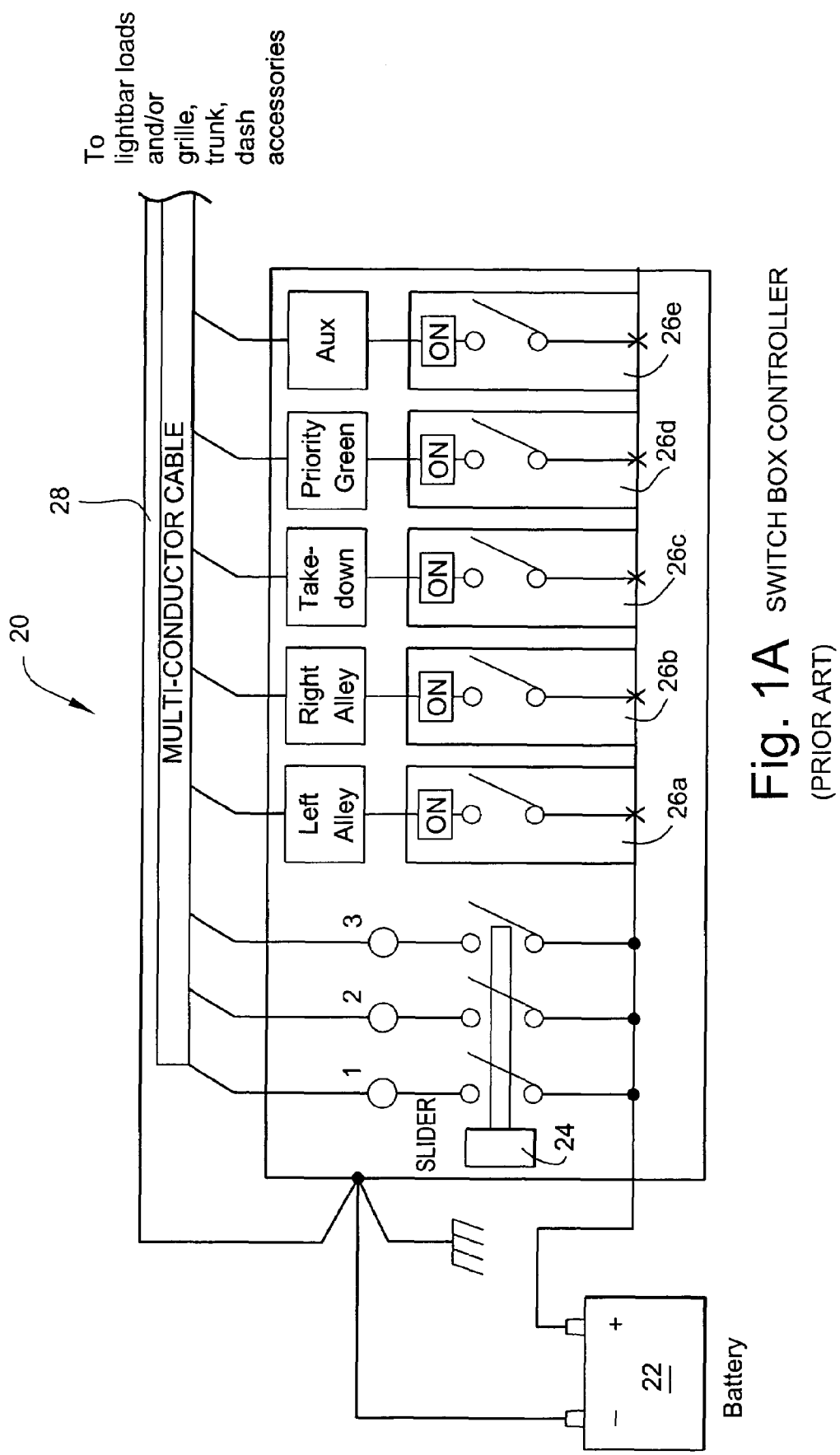
Fig. 1A SWITCH BOX CONTROLLER (PRIOR ART)

Fig. 3  EXAMPLE POLICE VEHICLE WITH CURRENT MODULATED LOAD COMMUNICATIONS TECHNIQUE

EXAMPLE COMMUNICATIONS SYSTEM OPERATION

EXAMPLE COMMUNICATIONS SYSTEM

EXAMPLE REMOTE LOAD SWITCHING RECEIVER

CONTROLLED CURRENT MODULATED LOAD CIRCUIT

EXAMPLE DEMODULATOR CIRCUITS

EXAMPLE POWER
CONTROL CIRCUITS

EXAMPLE MODULATED LOAD FLOWCHART

EXAMPLE DEMODULATOR FLOWCHART

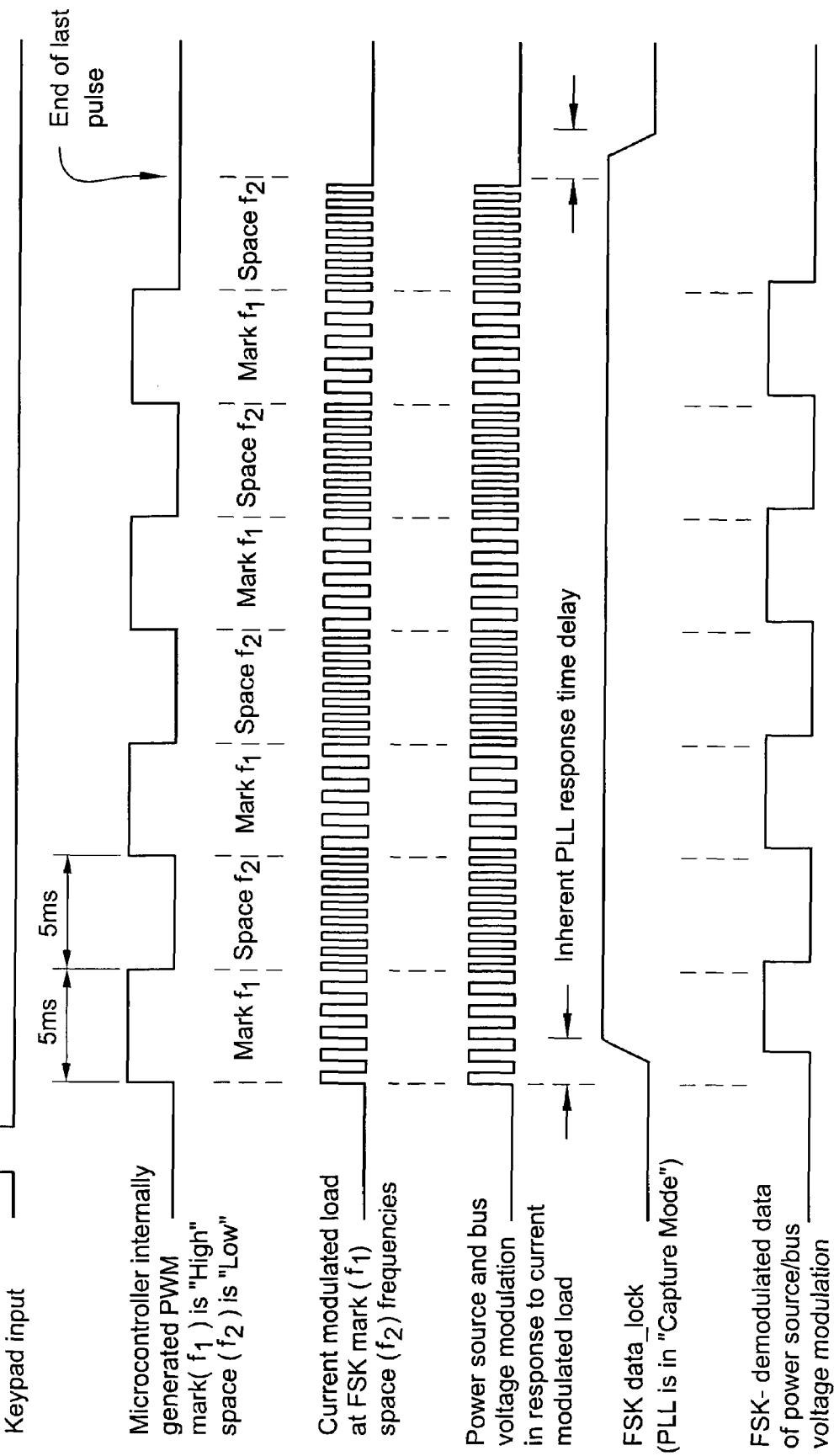

METHOD AND APPARATUS FOR COMMUNICATING CONTROL AND OTHER INFORMATION OVER A POWER BUS

CROSS-REFERENCES TO RELATED APPLICATIONS

Not applicable.

STATEMENT REGARDING FEDERALLY SPONSORED RESEARCH OR DEVELOPMENT

Not applicable.

FIELD

The technology herein relates to communicating information-bearing signals such as control signals over the power bus of a vehicle or other environment, and more particularly to modulating a current load with the information signal to induce a mirrored voltage modulation. Example applications include controlling devices including, but not limited to, emergency response lighting and/or sound-based warning systems such as, for example, police and other emergency response vehicle light bars.

BACKGROUND AND SUMMARY

We count on our police, firefighting and emergency medical response teams every day. Ambulance and fire department emergency response teams save countless lives and prevent property damage. Emergency response teams are able to help because of their skills, their training and their equipment. In the highly demanding world of front line police officers, fire fighters and emergency medical technicians, emergency equipment must work every time with practically 100% reliability.

Operating an emergency vehicle is one of the most common functions performed by today's fire and emergency service organizations. Yet, it is also one of the most dangerous. Collisions involving emergency vehicles and personal vehicles injure many people each year. Effective emergency response vehicle warning systems such as rooftop-mounted light bars, sirens, and the like, allow emergency response personnel to respond more effectively and safely. Manufacturers of emergency response vehicle equipment such as emergency warning lights, light bars, sirens, and the like, have spent considerable time and effort developing effective systems for warning of oncoming emergency response vehicles so motorists and pedestrians can get out of the way. Municipalities and governmental entities spend many millions of dollars each year to equip their emergency response teams with the most reliable, most effective warning systems available.

FIG. 1 shows an example of a marked or unmarked emergency response vehicle 10, including a conventionally wired light bar 12 on its roof 14 and conventionally wired grill and trunk accessories. Light bar 12 is a conventionally-designed light bar of the type most of us have seen on police cruisers, fire department vehicles, ambulances, tow trucks, emergency medical personnel vehicles, and the like. Light bar 12 can, for example, include conventional features such as for example low level flashers, strobe lights, rotating lights, illumination lights, speaker or other audible warning indicators, sweeping intersection lights, etc. One example is the MX 7000 manufactured by CODE 3 of St. Louis Mo. See, for example, U.S. Pat. Nos. 6,595,669; 6,585,399; 6,582,112; 6,461,022; 6,140,918; 6,081,191; D492,047; D489,466; D476,253; D460,950; D442,106; D427,537 and D410,402; and U.S. Patent Publication Nos. 2003/0007356, 2003/0012032 and 2005/0007784. Additional light and/or warning systems installed on-board the vehicle include grill mounted flashers, strobes or the like 16, trunk-mounted flashers, strobes or the like 18 and a conventional console-mounted switch box controller 20.

Automobile manufacturers such as Ford, General Motors, Chrysler and others typically manufacture special "police interceptor" versions of standard passenger vehicles. Such police interceptors often provide more powerful engines and alternators, heavy duty suspension and frame, spotlights, and other special features. One option sometimes provided is a light bar connector for providing power to a roof-mounted light bar, which consists of a power cable coming directly from the vehicle battery, which is left unterminated between the headliner and vehicle roof. However, such manufacturers typically do not ship emergency response vehicles with light bars already installed. Instead, oftentimes, the purchasing governmental entity (e.g., local police department, fire department, etc.) may install (or contract for installation of) such special equipment as required by particular emergency response personnel. Different police departments may make different choices concerning manufacture and type of light bar, siren, and other special emergency response equipment. In general, such equipment is not necessarily installed at the automobile manufacturer's factory, but rather is often installed later as part of an after-market vehicle customization process. Such customization can end up being expensive and time consuming because of the additional wiring and other vehicle customization that may be required.

As shown in prior art FIG. 1, one prior art approach to controlling light bars and other auxiliary equipment was generally to run an extensive set of multi-conductor cabling throughout the vehicle from a switch box controller (e.g., of the type shown in FIG. 1A) to the device or devices being controlled. The FIG. 1A exemplary prior art switch box controller 20 in this exemplary illustration includes a heavy single (12 V) or dual (+12V, ground) power input connection (e.g., heavy gauge such as AWG #4, #6, or #8) from the vehicle battery 22. Switch box controller 20 switches the incoming vehicle battery power connection via various switches including, for example, a slider switch 24, also known as a progressive switch, and rocker-type ON/OFF switches 26 as is conventionally known.

The exemplary illustrative prior art FIG. 1 & 1A switch box controller 20 outputs its switched power outputs through a multi-conductor cable bundle 28 having a separate conductor for each of the various devices being controlled. For example, a conductor output by the switchbox controller 20 might be used to control the light bar 12 rotators, another output might be used to control light bar 12 alternating flashers, still other conductors might be used to control left and right alley lights, take down lights, a Priority Green optical preemption emitter, etc. Typically, multiconductor cable 28 may comprise a 13-conductor (or more) thick cable with ground.

While this design is highly reliable and has worked well for a number of years, it has the disadvantage that the resulting multi-conductor bundle of cables must be routed throughout the vehicle to the devices being controlled. FIG. 2 shows one example of what can be involved in installing conventional light bars and associated control equipment in a standard conventional police interceptor-type vehicle.

Generally, it is typically necessary for the after-market installer to run a multi-conductor wiring harness from the control interface unit on the console or dashboard through the vehicle in between the headliner and inside of the vehicle roof to the light bar. As FIG. 2 illustrates, this may involve an extensive amount of disassembly of the vehicle including, but not limited to, removal of seats, dashboard portions and the like. All of these operations are time consuming and therefore are not only expensive but may delay operational use of the vehicle by emergency response personnel. Such cable routing can be costly due to the need to conceal the cables within headliners and other interior portions of the vehicle. Such installation may require a number of hours of work by a skilled technician. It is not unusual for initial installation efforts to be unsuccessful, requiring the partial or entire disassembly/reassembly process to be repeated in order to relieve crimped cables, bad connections, cosmetic bumps and blemishes, etc. If such wiring fails after installation, the same sort of disassembly process may be required to repair or replace the wiring harness. This can result in downtime during which the vehicle cannot be used. The same type of extensive customization process may be required for other emergency type vehicles such as tow trucks, volunteer fire department vehicles, emergency medical vehicles and the like.

It would be desirable to provide a more easily installed yet highly reliable communications link to allow the user control interface within the vehicle to communicate information signals to the light bar without the need to run additional wiring.

The technology herein provides a way to use power wiring to a light bar or other device for delivering power from an automobile battery or other power supply as a path for communicating information such as control signaling.

In one exemplary illustrative non-limiting implementation shown in FIG. 3, an information signal to be communicated to a roof-mounted light bar or other electrical or electronic device travels over the vehicle's or other environment's power bus or other power conductor. In one exemplary illustrative non-limiting implementation, a modulated current load draws power supply current in an amount that is instantaneously responsive to at least some characteristic of the information signal to be communicated. This modulated current loading induces the vehicular or other power supply (e.g., DC battery) to modulate its output voltage in a manner that is responsive to the modulated current loading. A voltage sensor and demodulator also connected to the power bus senses the resulting voltage fluctuations and demodulates those fluctuations to recover or regenerate the original information signal. The recovered information signal may be used for any purpose including, but not limited to, controlling aspects of the operation of an emergency vehicle light bar or other audible and/or visual warning system or other device. The data sender and data receiver can be co-located to provide a full duplex or half duplex powerline communicated transceiver.

Those skilled in the art understand that one of the challenges to communicating signaling within a vehicle relates to the substantial amount of electrical noise the vehicle generates. Alternators, heater fan motors, ignition systems and light bar rotators all typically generate substantial amounts of noise that can interfere with signal communications from one point within a vehicle to another. Communications techniques provided by the illustrative non-limiting exemplary implementations described herein are able to communicate signals effectively and reliably over the main power bus used to supply power to all systems on board the vehicle. In accordance with one exemplary illustrative non-limiting alternate implementation, additional switches are provided to synchronously or asynchronously disconnect noisy vehicle loads from the power bus from time to time (e.g., during data transmissions) in order to reduce the amount of noise the voltage sensor/demodulator sees. Such additional techniques may be helpful in some circumstances to achieve better performance.

In accordance with an additional exemplary illustrative non-limiting implementation, a finite power-based powerline communications method comprises a transmitting method/arrangement and a receiving method/arrangement that can be used separately and/or together. The powerline transmitter makes use of the inability of a given power supply (e.g., a vehicle's 12 volt battery) to provide a completely voltage regulated output under a modulated current induced load, such that the power supply is power-reactive to said load. The operation of the transmitter produces a corresponding voltage mirror of the induced current modulation throughout the electrical system. To improve reception, a receiver located on the power line may increase the signal-to-noise ratio by momentarily removing some or all current-drawn loads and thus increasing the line impedance such that the filtering to extract a given transmitter signal is decreased while signal integrity is increased.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 1 shows an exemplary prior art emergency vehicle with conventional light bar controlled with a conventional multiconductor power cable;

FIG. 1A shows a conventional exemplary prior art control switch and power distribution switch box controller;

FIG. 11 represents exemplary electrical signals present in the various illustrative non-limiting implementations described herein.

DETAILED DESCRIPTION

Figure 2:
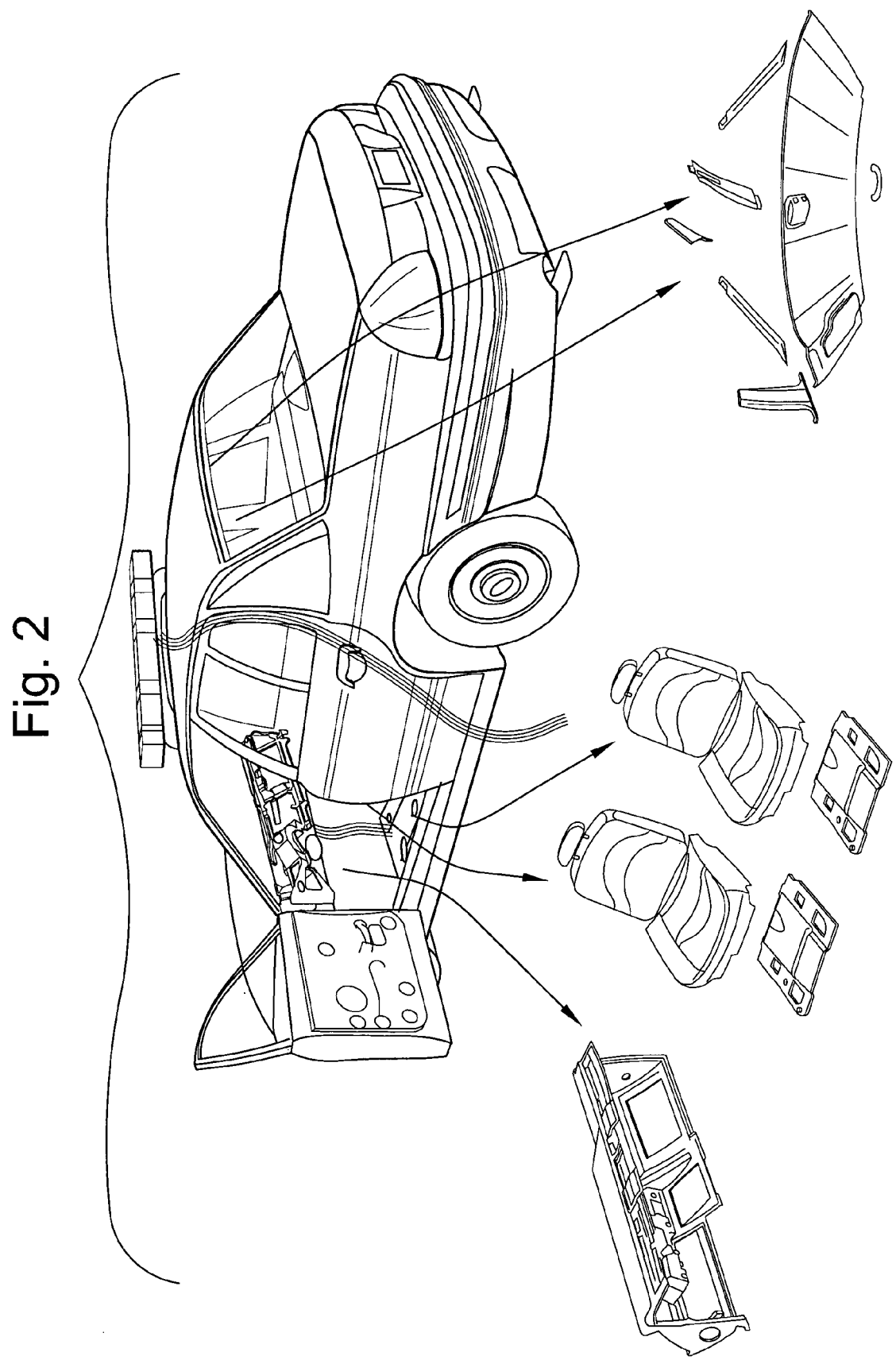
FIG. 2 shows the exemplary prior art emergency vehicle of FIG. 1 in a state that is disassembled to allow an installer to install the conventional light bar, multiconductor wiring harness and switch box controller.
Figure 3:
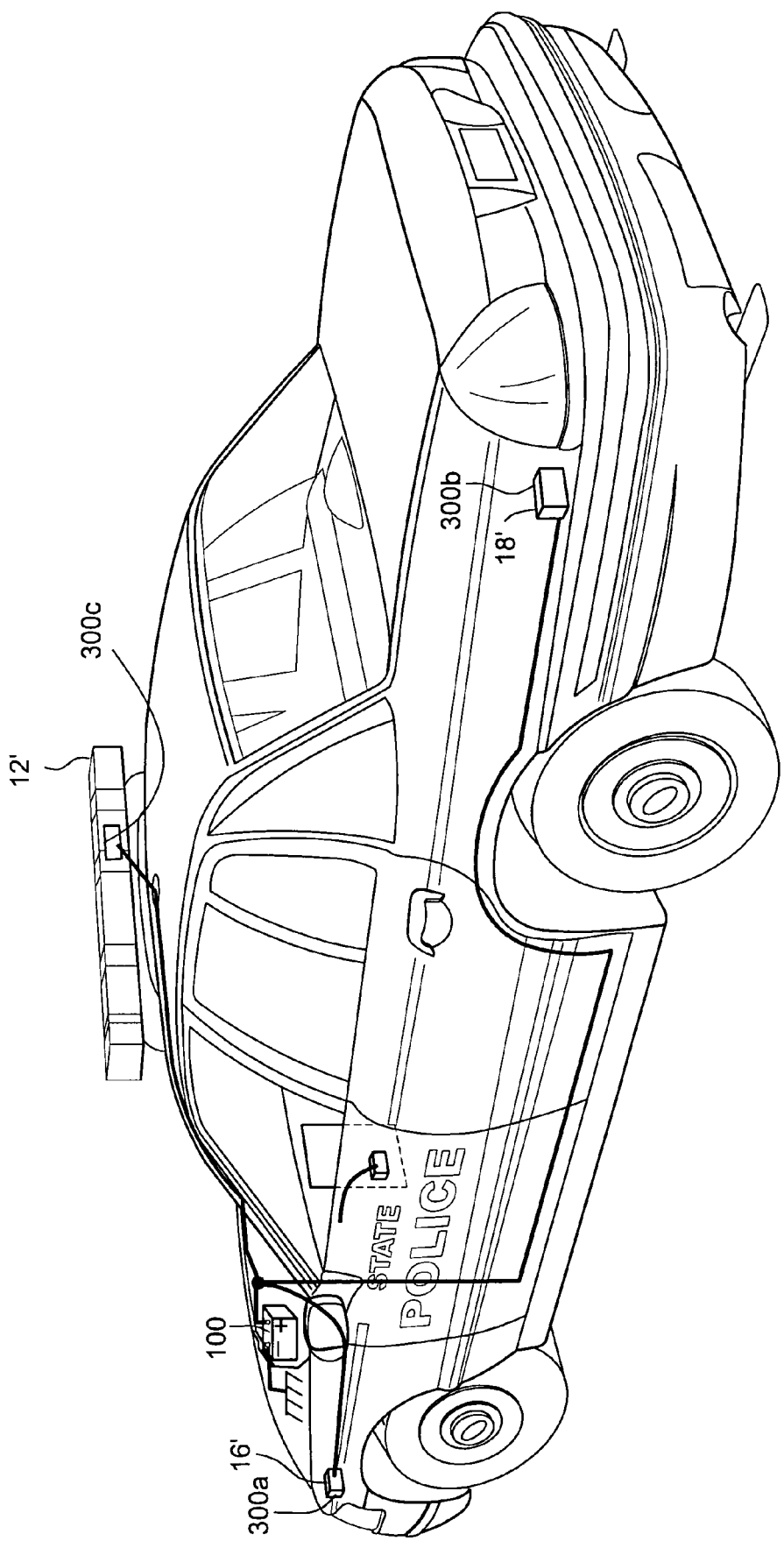
FIG. 3 shows an exemplary illustrative non-limiting implementation of the technology herein in a police vehicle including a roof-mounted light bar.

FIG. 3 shows an example police vehicle using the current modulated load communication technique described herein to communicate control signals between a dash or console mounted controller and a roof-mounted light bar. In the example shown, the multi-conductor cable power control bundle 28 is eliminated as no longer being needed or required. Instead, control signals are communicated via the main power bus that connects the battery to the light bar. Additional control signals may be communicated via the same bus to other devices located at various points within the vehicle. For example, a rear-mounted warning lamp, front headlight flashers, etc. may all be controlled via the same control mechanism and communications path over the main power bus of the vehicle. The cabling shown can be factor-installed single or two-conductor power cables, and the data transmitter connection may be a two-conductor connection to the local power bus as is conventional.

Figure 4:
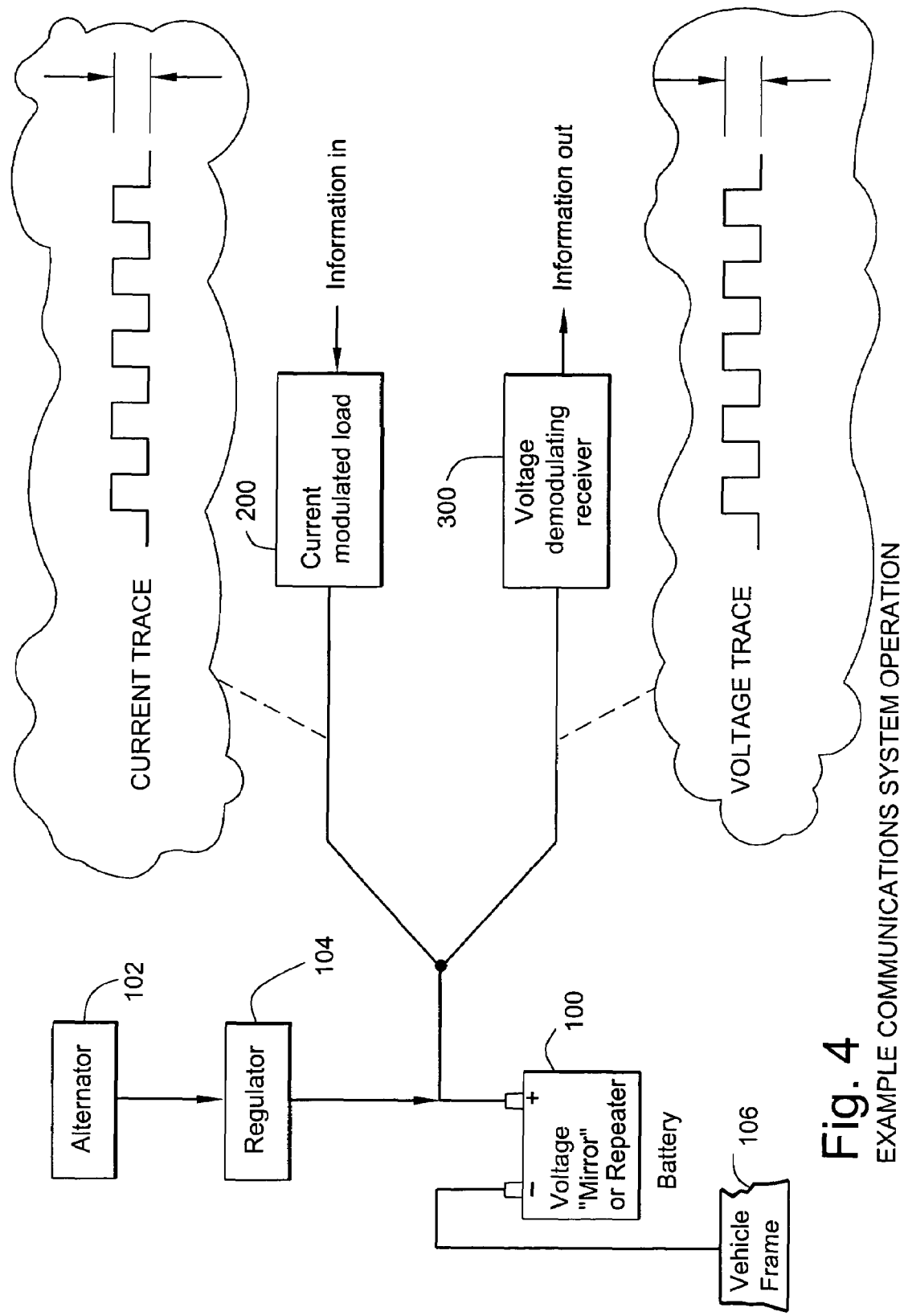
FIG. 4 illustrates the basic electrical relationship between the modulated current load and the battery, and between the battery and the receiver of the exemplary powerline communications system implementation of FIG. 3.

In the FIG. 3 arrangement, a current modulated load 200 is installed at or near the vehicle console and at each of controlled devices (e.g., light bar 12', front flashers 16', rear flashers 18') there is installed a voltage demodulator 300. FIG. 4 shows an example operation of the current modulated load communications system described herein. The example shown is in the context of a vehicle such as a police, emergency response or other vehicle that uses a direct current (DC) power bus, but other environments are also possible. In this particular example, a conventional 12 Volt DC or other lead acid type battery 100 supplies DC power to the vehicle (although other power sources such as fuel cells, solar cells, capacitive storage cells, or various other DC or AC power sources could be used instead). Battery 100 is recharged by a conventional alternator 102. The "−" terminal of battery 100 is connected to ground such as a point on the vehicle frame 106 although "+" rail type connections can be used instead.

In the exemplary illustrative non-limiting implementation shown in FIG. 4, information to be communicated ("information in") is applied to a current modulated load 200 that is connected to the battery 100's "+" terminal (in a positive-grounded system it could be just as easily connected to the "−" terminal). The "information in" controls modulated load 200 to vary the amount of current the load draws from battery 100. Because battery 100 is capable of delivering only a finite amount of current (i.e., it is a finite power source with respect to peak or maximum power delivery and/or amount of current that can be delivered over time), the loading on the battery due to the current modulated load 200 causes the output voltage produced by the battery to vary or fluctuate. The voltage fluctuations that current modulated load 200 induces on battery 100's output are responsive to the variations in current that the current modulated load 200 draws from the battery.

As shown in the particular illustrative exemplary non-limiting implementation shown in FIG. 4, if the current modulated load 200 draws current pulses as indicated by the square wave current trace (the peak-to-peak current is measured in amperes), then the voltage fluctuations induced at the battery 100's "+" output will similarly exhibit a square wave variation that "tracks" or follows the variable current being drawn by current modulated load 200. One way to think about what is happening is that battery 100 acts as a "mirror" or "repeater" by mirroring or repeating, in its voltage output, the variations in current being drawn by current modulated load 200. Another way to explain it is that by drawing a variable amount of current from battery 100, current modulated load 200 effectively causes the battery to modulate its voltage output in a way that is responsive to the variable current being drawn by the current load 200.

Figure 5:
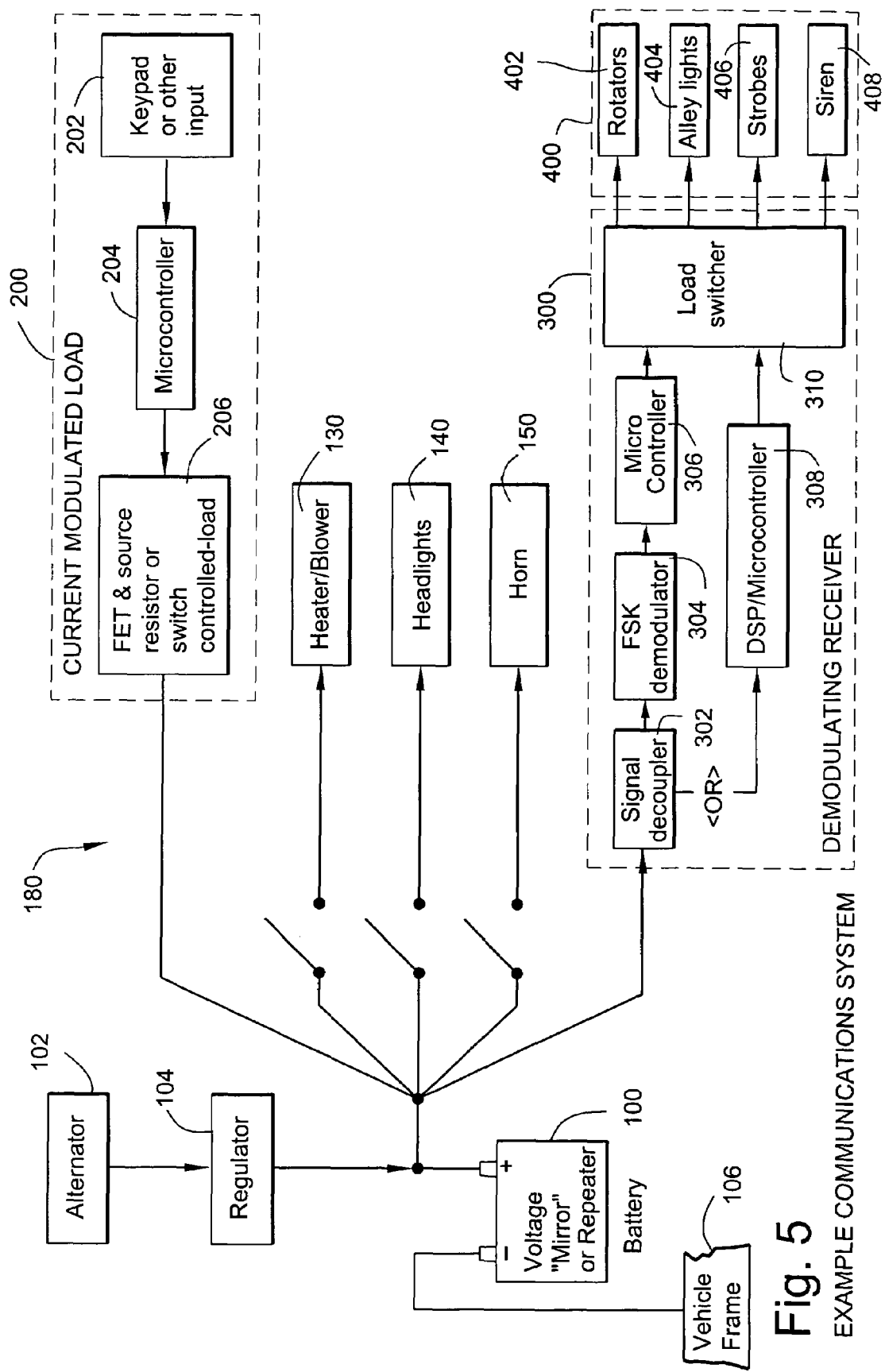
FIG. 5 is a more detailed block diagram of the exemplary implementation of FIG. 3.

In most conventional vehicles, every electrical device within the vehicle is directly or indirectly connected to the battery 100 as shown in FIG. 5, for example, a variety of different devices including heater blowers 130, headlights 140, horn 150, taillights, dashboard lights, radios, tape players, power antennas, engine ignition systems and controllers, radio location devices, electronic mapping devices, and any other electrical equipment you can think of may be connected to the output of battery 100. Typically, a main power bus connected to the battery 100's "+" output terminal delivers power to any and all electrical devices within the entire vehicle. The FIG. 4 exemplary illustrative non-limiting implementation takes advantage of this power distribution throughout the vehicle. More specifically, the voltage fluctuations exhibited at the battery 100's output as shown in FIG. 4 will inherently be distributed throughout the vehicle along the various wiring harnesses and power conductors that are used to power various on-board electrical devices within the vehicle. Virtually anywhere on the main power bus, it is possible to observe and detect these voltage fluctuations that current modulated load 200 induces on the battery 100's voltage output.

In the FIG. 4 exemplary illustrative non-limiting implementation, a voltage demodulating receiver 300 is placed somewhere (anywhere) on the power bus or network within the vehicle. For example, voltage demodulating receiver 300 could be connected to a power connector used to supply DC power to a roof-mounted light bar. The same or different voltage demodulating receiver 300 could be connected to power used to supply any other device on-board the vehicle. A demodulating receiver 300 could be co-located with one current modulated load 200, and another co-located demodulated receiver/current modulated load pair could be placed elsewhere in the vehicle to provide a half-duplex or full duplex powerline communications system. For example, such a bidirectional communications system could be used to provide positive acknowledgment of control signaling to ensure information integrity.

In the exemplary illustrative non-limiting implementation shown in FIG. 4, voltage demodulating receiver 300 senses the variable voltage present on the vehicle power bus. Voltage demodulating receiver 300 "demodulates" this variable voltage in order to regenerate a facsimile or approximation of the "information in" signal. Voltage demodulating receiver 300 provides an "information out" signal that represents such facsimile or regeneration. This "information out" signal can be used for any of a variety of different purposes including, for example, control, playback, audio and/or video generation, etc.

The exemplary illustrative non-limiting current modulated load 200 shown in FIG. 4 can use any form of modulation (e.g., frequency modulation, phase modulation, frequency shift keying modulation, amplitude modulation, pulse width modulation, continuous wave, other) to modulate the current being drawn by current modulated load 200 in response to the "information in" signal. The particular design of voltage demodulating receiver 300 will be generally determined by the type of modulation and the information encoding used by current modulated load 200.

FIG. 5 shows an example more detailed overall communications system 180 using the exemplary non-limiting techniques shown in FIG. 4. In the FIG. 5 example shown, current modulated load 200 includes a keypad or other input 202 that is provided to a microcontroller 204. The microcontroller 204 responds to the user inputs supplied via keypad or other input 202 and encodes the resulting user input actions into digital form.

In the particular exemplary illustrative non-limiting implementation shown, the "information in" and "information out" signals can be any types of information signals including digital, analog, audio, video, control, intelligence, or any other type of information that needs to be conveyed. In one particular illustrative non-limiting implementation, the "information in" signal could, for example, comprise digital control signals used to control the operation of a number of different electrical devices within a roof-mounted light bar. As one example, the "information in" signal can be a digitally-encoded bit pattern (4, 8, 16, or other bit) digital format where the signals in combination are used to control different light bar devices. An example encoding is shown below in Table 1 for purposes of illustration, but any desired encoding could be used as those of ordinary skill in the art will recognize.

TABLE I

| Bit Pattern | |
|---|---|
| 0000 | Reserved |
| 0001 | Turn on rotator |
| 0010 | Turn off rotator |
| 0011 | Turn off flasher/strobe |
| 0100 | Turn off flasher/strobe |
| 0101 | Turn on siren |
| 0110 | Turn off siren |
| 0111 | Turn on alley ligt(s) |
| 1000 | Turn off alley light(s) |
| 1001 | Turn on takedown lights |
| 1010 | Turn off takedown lights |
| 1011 | Turn on priority green |
| 1100 | Turn off priority green |
| 1101 | Aux on |
| 1110 | Aux off |
| 1111 | Reserved |

Referring to FIG. 5 for example, an output of microcontroller 204 is provided to a field effect transistor (FET) and source resistor or other switch controlled load 206. Switch controlled load 206 could, for example, comprise a specially provided load such as a constant current load, or it could comprise an existing, substantially resistive load such as for example vehicle headlamps (which could be switched on momentarily during daylight or switched off momentarily during nighttime to provide a current loading that is at least in part responsive to the microcontroller 204's output). The microcontroller 204 output controls the switching load 206 to be connected or not connected to the battery 100 terminal or in some cases may control the amount of current that the switch controller load 206 draws from the battery. In the example shown, microcontroller 204 uses a conventional frequency shift keyed (FSK) technique with "marks" and "spaces" to frequency shift key modulate the switch controlled load 206. This induces an FSK modulated signal on the voltage produced by battery 100.

As also shown in FIG. 5, the battery 100's output is coupled to demodulating receiver 300 which in this particular exemplary illustrative non-limiting design includes an FSK demodulator. In more detail, one exemplary demodulating receiver 300 design may include a signal decoupler 302 which provides an output to an FSK demodulator 304.

In that particular implementation, the FSK demodulator 304 provides a demodulated digital output to a microcontroller 306 which decodes the resulting digital signals. As those skilled in the art understand, the signal decoupler 302, FSK demodulator 304 and microcontroller 306 may, if desired, all be implemented by a digital signal processor/microcontroller 308 or other implementations (discrete and/or integrated) may be used. Load switcher 310 responds to the digitally decoded control signals to selectively actuate light bar 400 devices such as rotators 402, alley lights 404, strobes 406, sirens 408, etc.

Figure 6:
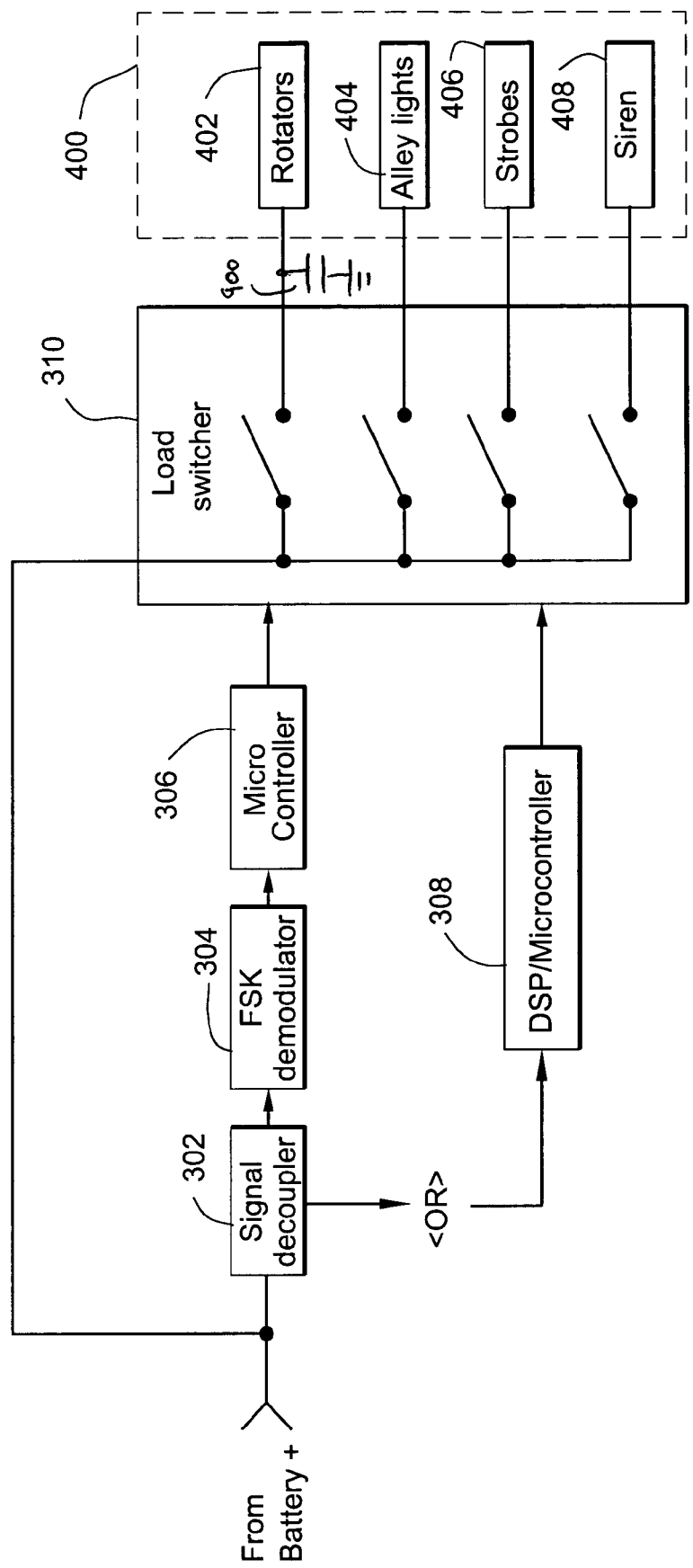
FIG. 6 is a block diagram of an additional exemplary implementation of the FIG. 3 system including an interruption feature to decrease noise.

FIG. 6 shows an example more detailed schematic block diagram of an illustrative non-limiting exemplary demodulating receiver 300 providing additional load switching functionality to suppress noise. In the example shown, load switcher 310 may comprise a variety of discrete switches that are electrically controlled by the digital output of microcontroller 306 or DSP/microcontroller 308. Such switches may include for example transistors including for example FET's, triacs, relays, solenoids or any other convenient switch design. In the example illustrative non-limiting implementation shown, load switching thus occurs within or in proximity to light bar 400 as opposed to remotely such as at a dashboard or console control switch box. Furthermore, it is possible for microcontroller 306 to temporarily and selectively switch off noisy electrical loads such as rotators 402 during data reception by demodulating receiver 300 to reduce the amount of noise present on the power bus during signal transmission. If such selective switching occurs relatively rapidly (e.g., for 20 ms or less), it will generally be unnoticeable to any observer of the light bar's operation. Such switching can occur in synchronism with operation of current modulated load 200, or it could occur asynchronously (e.g., periodically).

Using load switcher 310 to selectively or fully remove the load from any given branch circuit connected to a demodulating receiver 300 serves to dramatically increase the branch circuit impedance, such that said branch circuit acts as a signal radiator responsive to the voltage modulation produced by battery 100 instead of a current-carrying conductor supplying power to the load(s) controlled by load switcher 300. Those skilled in the art will recognize that the extensive filtering and demodulating circuitry for receivers located on the same branch circuit as noise producing loads (e.g.—switching power supplies, flashing lamps, blowers, etc.) is not necessary if those loads are simply turned off.

Load switcher 310 may be configured intelligently (e.g.— under the control of microcontroller 306) such that non-varying resistive loads, which produce minimal electrical noise, will remain in conduction (e.g.—"on" state), while inductive, capacitive loads, and/or constantly varying resistive loads will be interrupted in order to increase the powerline conducted signal-to-noise ratio so that demodulating receivers (e.g.—signal decoupler 302 and FSK demodulator 304) easily decouple any voltage modulation present on the powerline.

A further embodiment of load switcher 310 includes the addition of capacitors 900 on the load-side of the switch and/or switches. Those skilled in the art will recognize that a properly sized capacitor 900 will continue to temporarily supply power to a load or loads for a brief period of time if load switcher 310 interrupts power (e.g.—an inexpensive 100,000 microfarad capacitor will easily sustain power to rotators 402, which may draw an average of five amperes, for several milliseconds, while intelligence is being voltage modulated over the power bus). A further advantage of this particular enhancement is the reduction of overall noise on the entire electrical bus due to decreased in-rush current that can be present when a load is fully de-energized and then is suddenly turned on, particularly if the turning on and off of said load is continuous and frequent.

As also shown in FIG. 6, for example, in one illustrative implementation, demodulating receiver 300 may be relatively compact so that it can be installed within a conventional light bar 400. This means that a single positive (or negative) power connection to battery 100 can be used to both supply power to a light bar 400 and also to supply control signals for controlling operation of the light bar. Use of a single power conductor of this type eliminates the need to run multi-conductor power or control cabling to the light bar and also in many cases may allow the installer to make use of a single power conductor (or two-conductor, if the positive and ground conductors are run together) installed at the vehicle factory as the only connection required to both power the light bar and control it.

Figure 7:
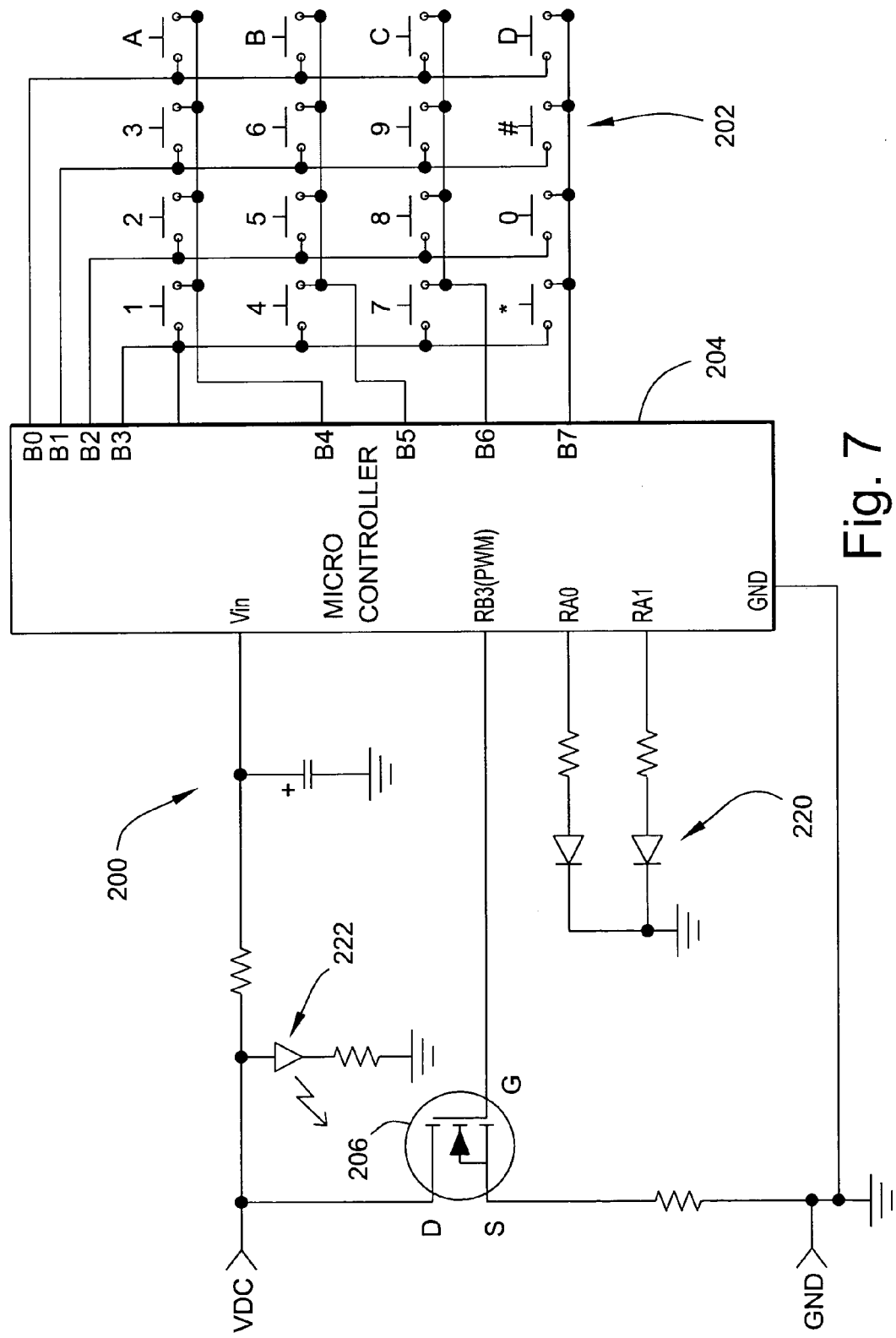
FIG. 7 is a schematic diagram of an exemplary illustrative non-limiting implementation of a modulated load.

FIG. 7 shows an exemplary illustrative non-limiting implementation of a controlled current modulated load circuit 200. In the example shown, a microcontroller 204 receives input from a keypad 202 or any other arrangement. In the example shown, keypad 202 may comprise a conventional telephone type keypad allowing an operator to input up to sixteen different types of switch closures. In other implementations, the keypad or other input device 202 may take the form of a conventional switchbox of the type shown in FIG. 1A including for example a slider or progressive switch and a number of discrete ON/OFF toggle switches. The outputs of keypad or other input device 202 are provided to the inputs of controller 204. Controller 204 may provide local indicator lights such as shown generally at 220, 222 (an additional LCD or other display may also be provided if desired). In addition, a gate control signal 222, which may be post width modulated, is provided at an output of controller 204. This gate control signal 222 is applied to the gate of a field effect transistor (FET) 206 operating in the enhancement mode. The controller may selectively switch-connect an additional FSK oscillator (e.g., with an output frequency in the range of 11.5 KHz to 12.5 KHz) to the FET gate input, or such FSK oscillation generation may be provided by the controller under software control.

In one example illustrative non-limiting implementation, a current-modulated load can be a N-channel MOSFET operating in the enhancement mode. The FET source is connected through a resistor to ground. The FET drain is connected to the positive powerline rail. A constant current may be drawn through this arrangement that is dependent on (1) the voltage applied to the FET gate, and (2) the value of the FET's source resistor, while independent of the voltage present on the positive powerline rail.

A FET operating in the enhancement mode for the purpose of drawing a constant current is well known in the art. However, in the illustrative exemplary non-limiting implementation herein, the FET is modulated for the purpose of communicating signaling across the vehicle's electrical system as will be described.

Most vehicles contain electrical systems which, at their core, are powered by batteries that are recharged by alternators. All batteries have maximum delivery capacities, and are usually rated in ampere-hours. Lead-acid batteries—the type most commonly found in vehicles-exhibit an open circuit voltage that instantly decreases when a load is applied. This voltage drop (as measured from the open circuit voltage) is dependent upon the relative charge of the battery and the total load applied.

If the FET is modulated such that a constant current is drawn on a given frequency and duty cycle from the electrical system power system's battery, the battery's output voltage will be current modulated such that the resulting voltage waveform will reflect the load applied. For example, if a FET were driven in the enhancement mode such that it produces a square wave frequency of 10 kHz at a duty cycle of 50% when the current drawn by the FET in conduction is 5.0 amperes and the power source is a lead acid battery (with or without the associated alternator operating in the charging mode), it can be observed that, depending upon the level of charge existing on the battery (and whether or not the alternator is charging the same), and assuming that there are no other connected loads, the measured peak-to-peak voltage of the resulting battery voltage can vary from as little as 40 millivolts to as much as 500 millivolts for an average vehicle battery. This voltage variation, which is present throughout the entire electrical system regardless of switching on and off of the loads, can be easily detected and demodulated without complex filtering and/or sophisticated demodulating circuitry. Those skilled in the art will recognize that the actual amplitude of the voltage modulation produced by the battery will be influenced by other loads connected to the vehicle's power bus. Modulation of the N-channel MOSFET operating in the enhancement mode, or any switch that draws a predictable or unpredictable current at a given frequency, will cause a finite (or limited) power source (e.g., a lead acid battery) to become a "radiator" of a resulting current-modulated signal that is represented as a "voltage mirror" of the transmitter itself. Thus, the finite power source becomes a transmitter "repeater" that produces a similar, if not identical, voltage signal on each electrically connected node of the system.

Powerline carrier receivers that are in line with heavy current loads also producing lots of conducted noise typically use extensive filtering in order for any reliable signal data to be extracted. If the noise produced is also a by-product of numerous loads constantly turning on and off (e.g., an emergency vehicle light bar), then the problem is further exacerbated. As is well-known, generally the best receiver for any type of signal is an antenna. The very nature of most antennas is that they are usually resonant at or near a desired frequency of interest, that the overall line impedance is relatively high, and the desired frequency sought (or to be tuned) is effectively coupled to a given receiver. In the exemplary illustrative non-limiting implementation, a single wire that performs as an antenna and high current conductor is used to decouple a power line carrier signal and still be capable of delivering power to a given load.

One characteristic of a MOSFET is its inherent ability to switch loads rapidly on and off. What was once accomplished with large mechanical relays that occupied rather large mounting footprints can now be handled inexpensively with a small FET that is also capable of switching tens of amperes of current. An FET (or any other high speed current switching device) may be used to isolate the load on a single current-carrying conductor such that the conductor changes rapidly from a low to high impedance state during which time a power line carrier signal can be effectively decoupled from the same conductor which, in its high impedance state, more closely resembles an antenna. On a single conductor (e.g., the 12 VDC cable connected to a light bar), between the load and power source is a receiver and a FET switch. The FET is located between the receiver and the load and hence, by proximity and electrically, the receiver would be in closest proximity to the power source. At a given point in time (e.g., predetermined in advance and/or synchronized to a received signal and/or asynchronously), the FET opens (i.e., disconnects the load) such that the conductor's impedance changes from low to high. This increases the signal-to-noise ratio that previously existed (while the FET was in conduction) and therefore permits a direct-coupled receiver to more easily extract a data signal from the power line.

Figure 8A:
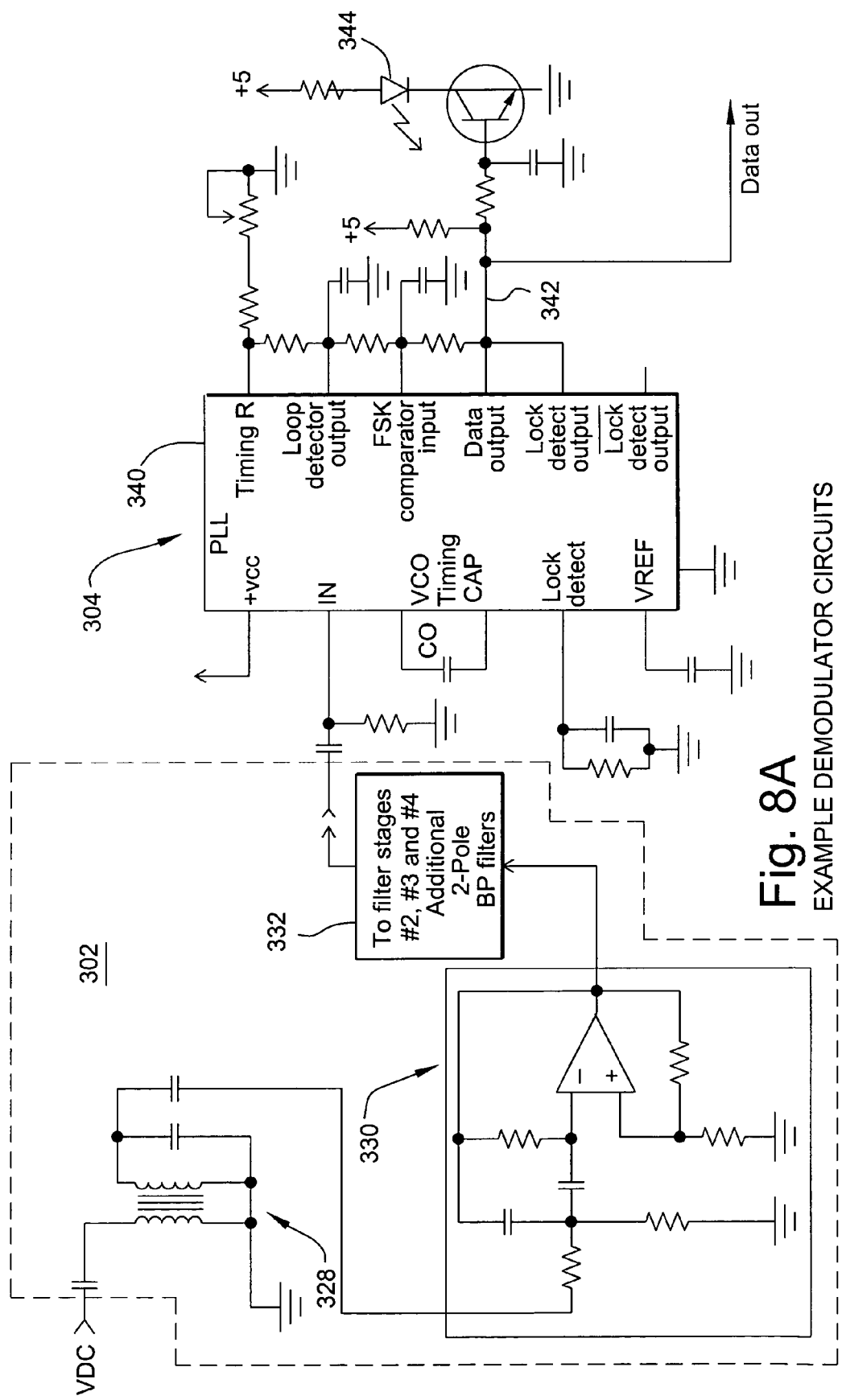
FIG. 8A is a schematic diagram of an exemplary illustrative non-limiting signal capture and demodulation implementation.

FIG. 8A shows an example more detailed illustrative non-limiting implementation of a demodulating receiver 300. In the example shown, the connection from battery 100 may be filtered with a conventional tank circuit 302 and then filtered by a conventional bandpass filter 330. Any number of bandpass filter stages 332 may be used to provide a two-stage, three-stage, four-stage or any desired type of bandpass filter. The decoupler 302 in filtering is generally used to eliminate noise. It is well known that many of the electrical devices operating within a vehicle generate substantial amounts of wide-band noise. The ignition system typically produces significant radiated and conducted noise because it generates sparks and has a variety of switch closures and openings. Any device with a motor (e.g., a heater blower, an air conditioner fan, a light bar rotator, etc.) may all also generate substantial amounts of electrical noise and place such noise on the vehicle's main power bus. The signal decoupler 302 filters out as much of this noise as possible while passing the desired information-varying signal onto an FSK demodulator 304 in the form in this particular illustrative non-limiting implementation of a phase lock loop 340. As will be understood by those of ordinary skill in the art, the current modulated load controller 204 is preferably designed to provide a particular known frequency output to FET 206 so that a frequency-selective signal decoupler may be used to provide frequency-selective noise rejection (i.e., only pass a particular narrow frequency range of frequencies while rejecting noise at other frequencies). Such techniques are well known to radio operators attempting to copy Morse Code or other intelligence on a noisy frequency band such as during mid-summer electrical storms.

In the exemplary arrangement shown in FIG. 8A, phase lock loop 340 comprises a conventional phase lock loop integrated circuit that locks onto the FSK frequency and detects the presence of "mark" and "space" FSK modulation—producing a data output on line 342. Such data output may be used to control indicator light 344 and is also provided in the illustrative exemplary non-limiting implementation shown to the input of a microprocessor 306 shown in FIG. 8B. Microprocessor 306 decodes the resulting digital output and provides decoded control signals to MOSFET or other drivers 350. These driver circuits may drive FET or other electronic switches 352 to control on/off power to a number of loads such as rotators 402, alley lights 404, strobes 406, siren 408, priority green transmitters 410, or any other electrical or electronic device imaginable.

Figure 9:
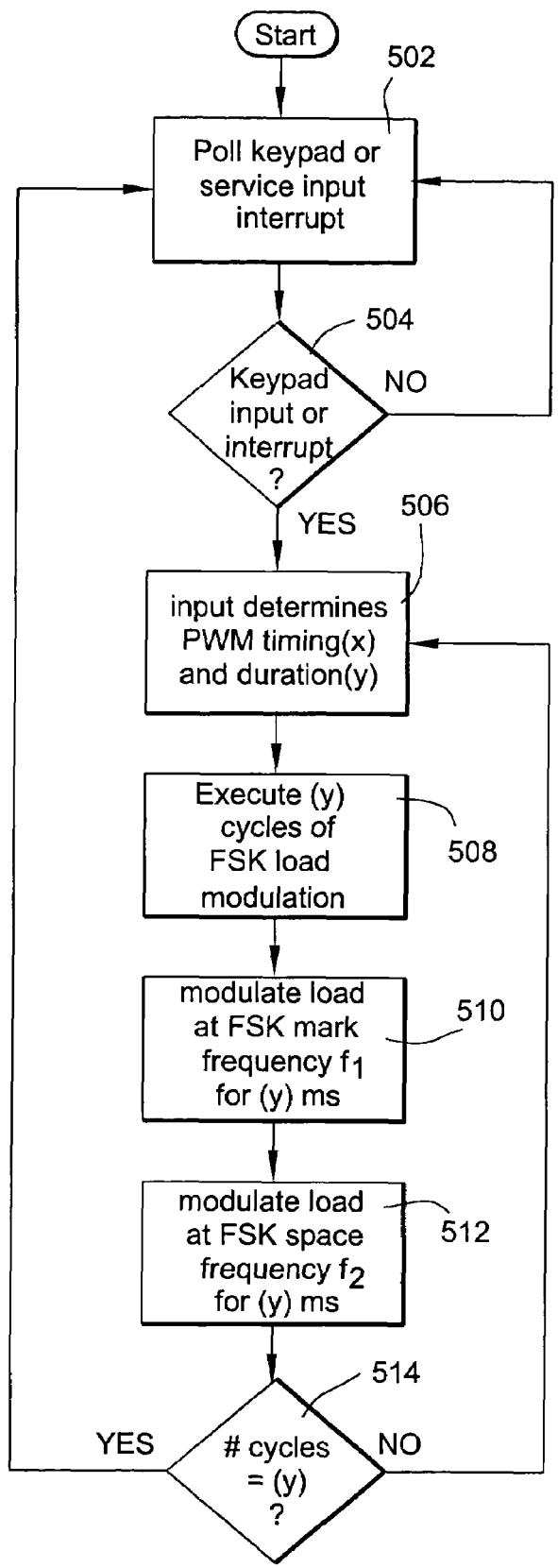
FIG. 9 is a flowchart of example program control steps for an exemplary illustrative non-limiting pulse width modulated load.

FIG. 9 shows an exemplary illustrative non-limiting flowchart of program control steps that the controlled current modulated load controller 204 may perform. FIG. 9 illustrates one possible communications method—in this case frequency shift keying (FSK) at the load to produce a pulse width modulated (PWM) data stream at the receiver. The controller 204 may, for example, periodically poll the keypad or other input device 202 or may respond to service and input interrupt (block 502) as those skilled in the art understand. If a keypad input or interrupt is detected ("yes" exit to decision block 504), the controller 204 determines pulse width modulated timing and/or duration (block 506) and then may execute an appropriate number of cycles of FSK load modulation (block 508).

This particular example illustrative non-limiting implementation assumes that a given keypad entry will produce a 50% duty cycle pulse width with mark and space times of (x) ms (see FIG. 10 timing diagram) for (y) duration (# of cycles). The controller 204 may then modulate the load 206 at an FSK mark frequency $F_1$ for the desired duration (block 510). It may also then modulate the load at the FSK space frequency $F_2$ for a desired duration (block 512). It may repeat these steps for a desired number of FSK modulation cycles ("no" exit to decision block 514) before returning to poll or otherwise service the input device 202 ("yes" exit to decision block 514).

Figure 10:
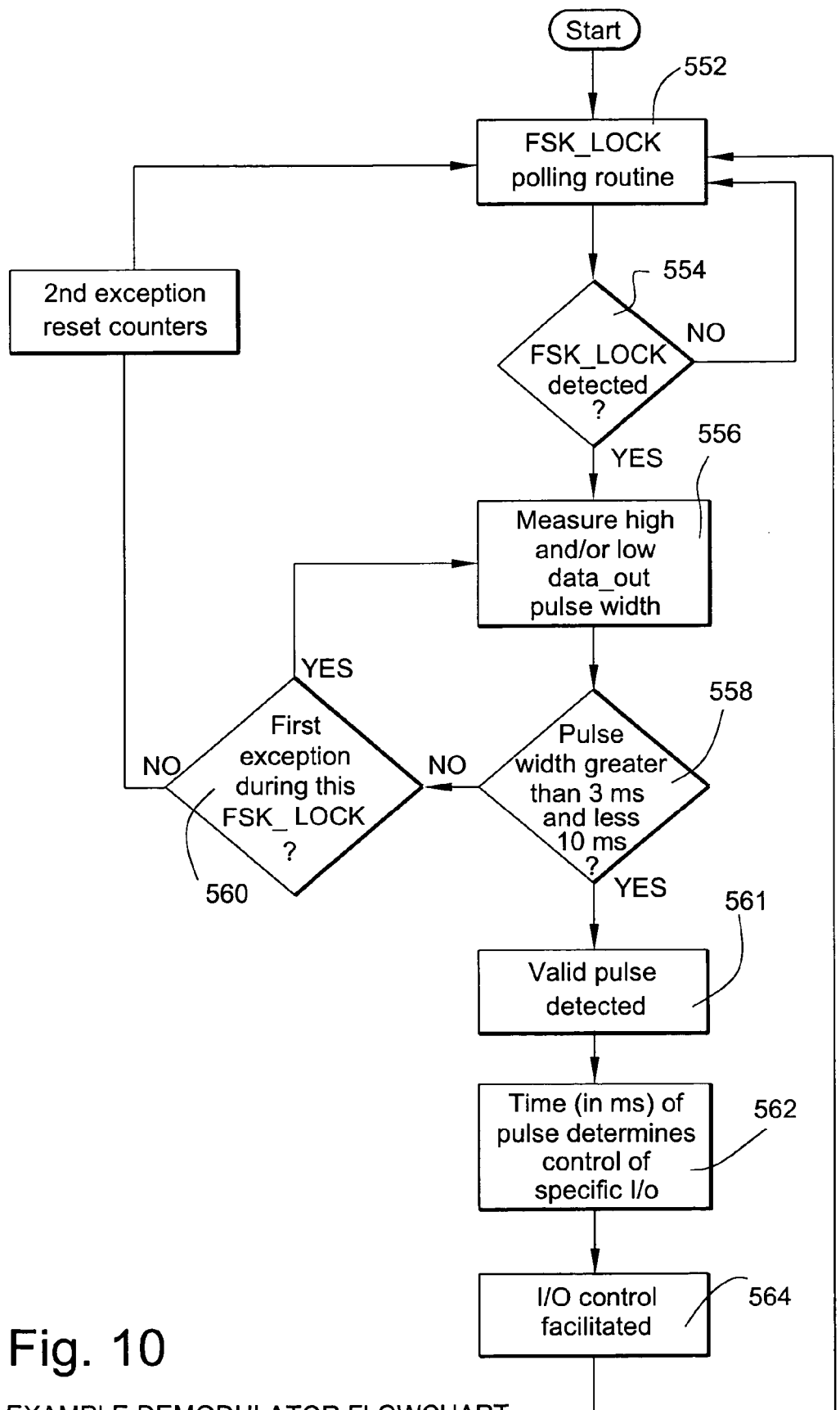
FIG. 10 is a flowchart of example program control steps for an exemplary illustrative non-limiting pulse width modulated receiver and controller.

FIG. 10 shows an exemplary illustrative non-limiting flowchart of program control steps for the receiver microcontroller 306. In this particular example shown, the receiver microcontroller 206 performs a polling routing to determine whether the FSK demodulator 304 has achieved a lock (e.g., based on the FSK_LOCK output from the demodulator) (block 552). Once FSK lock has been detected ("yes" exit to decision block 554), then the microcontroller 306 measures high and/or low data out pulse width on FSK demodulator 304's data out line (block 556). This latter operation distinguishes between noise spikes and intelligence bearing signals in the exemplary illustrative implementation by requiring information-bearing pulses to have a certain duration that is greater than most noise spikes (e.g., 3 ms) but less than voltage changes induced by activation of a typical vehicular device (e.g., 10 ms) (decision block 558). If no valid pulse is detected ("no" exit to decision block 558), then microcontroller 306 determines whether this a "first" exception during this particular FSK lock operation (decision block 560). If this is not the first exception ("no" exit to decision block 560), then counters are reset (block 562) and control returns to the FSK lock polling routine (block 552). If the pulse received is not a valid pulse and this is the first exception during the current FSK lock operation ("yes" exit to decision block 560), then control returns to re-measuring the high and/or low data out pulse width (block 556).

If, on the other hand, decision block 558 detects a valid information pulse ("yes" exit to decision block 558; block 560), then microcontroller 306 determines the pulse duration which, in one exemplary implementation, determines the control of a specific I/O device (block 562). For example, in one exemplary illustrative non-limiting implementation, a pulse duration of 4 ms may provide one type of I/O whereas a pulse duration of 7 ms may determine another type of I/O. In the exemplary illustrative non-limiting implementation shown, microcontroller 306 facilitates the type of I/O control required (block 564) and then control returns to block 552.

Figure 8B:
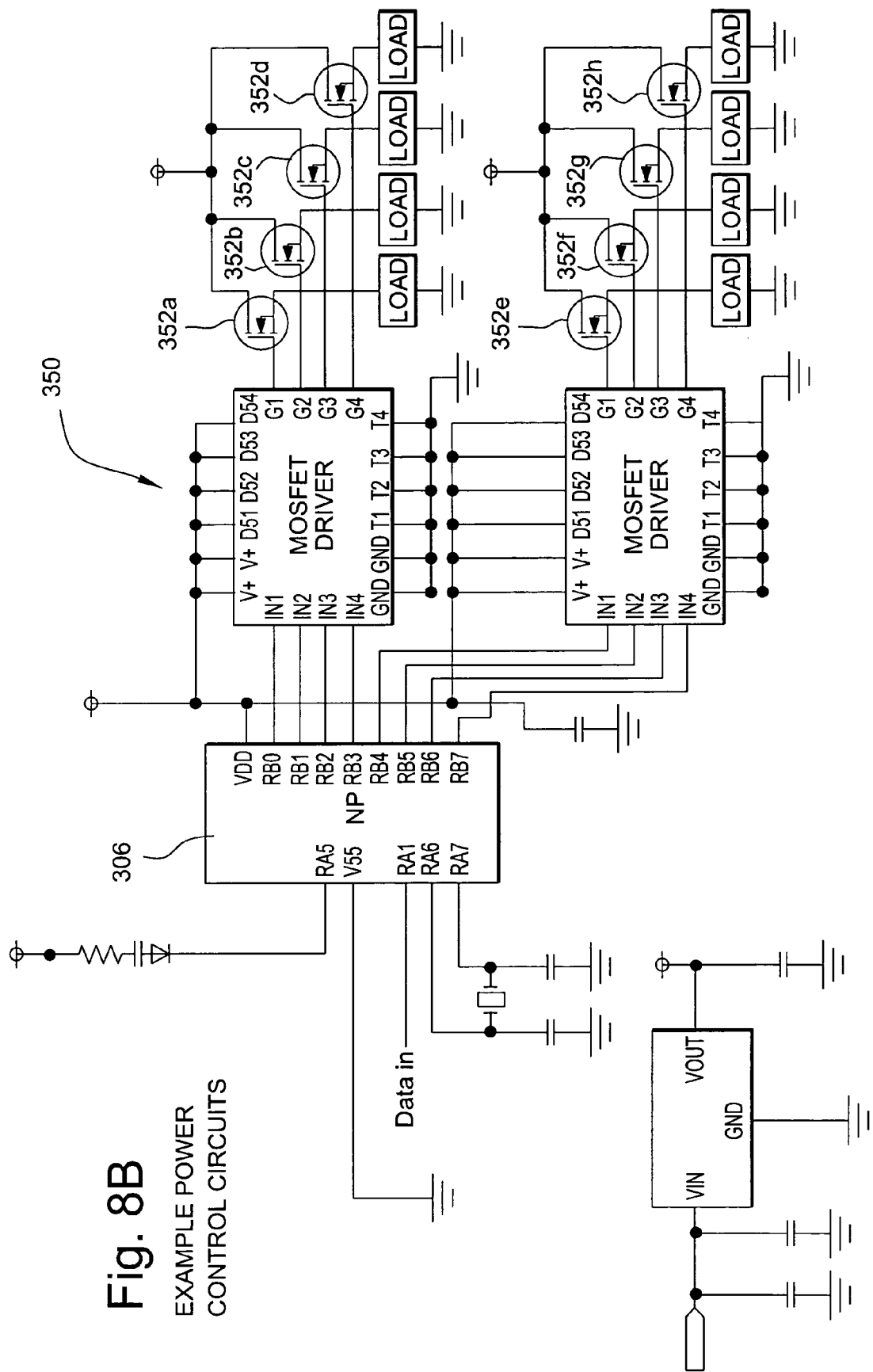
FIG. 8B is a schematic diagram of an exemplary illustrative non-limiting light bar controller implementation.

FIG. 11 shows some example illustrative waveforms that may be present within the exemplary illustrative non-limiting implementation shown in FIGS. 7, 8A and 8B. In this particular exemplary illustrative non-limiting implementation, the keypad input on the top line is decoded as "send 4 pulses, f1=5 ms (mark, high), f2=5 ms (space, low). Of course, other modulation durations, schemes and/or arrangements are also possible. Note that the bottom line in the diagram exhibits a slight PLL response delay on FSK data after data_locked is enabled.

All sources and other items cited above are hereby incorporated by reference into this patent specification as if expressly set forth herein.

While the technology herein has been described in connection with exemplary illustrative non-limiting embodiments, the invention is not to be limited by the disclosure.

For example, while illustrative non-limiting exemplary implementations described herein relate to controlling visible and/or audible warning systems for emergency response motor vehicles, the technology herein is not limited to those particular applications or environments. For example, the technology herein could be used on different types of vehicles including trains, airplanes, buses, boats, spacecraft, or any other type of vehicle. The technology herein could be used to control devices and equipment other than warning devices, including for example ignition and engine management systems, entertainment systems, navigation equipment, driver or passenger comfort and/or convenience equipment, vehicle networking and/or integration, or any other type of equipment that can be used on board a vehicle. Furthermore, the technology herein is not limited to control of devices on vehicles, but rather than be used in any context whatsoever wherein it is desirable to communicate information of any type over a powerline. While the illustrative non-limiting exemplary implementations herein relate to DC powerline applications, other powerline applications (e.g, AC, other) could be used. The invention is intended to be defined by the claims and to cover all corresponding and equivalent arrangements whether or not specifically disclosed herein.

I claim:

1. In a vehicle including a finite power source connected to a vehicle power bus, said power bus delivering power from said finite power source to electrical devices mounted on said vehicle, a method of communicating control signaling over said vehicle power bus while said bus is carrying power to said devices, said method comprising:
    using an information signal to control a current load coupled to said finite power source to thereby modulate the current drawn by said current load in response to said information signal, said modulated current load changing the electrical load on said finite power source to thereby induce voltage fluctuations on said power bus that are in response to said information signal;
    sensing said induced voltage fluctuations on said power bus; and
    demodulating said sensed induced voltage fluctuations to recover said information signal.

2. The method of claim 1 further including controlling a device to generate an audible indication in response to said information signal.

3. The method of claim 2 wherein said audible indication comprises a siren.

4. The method of claim 2 further including controlling a device to generate a visible indication in response to said information signal.

5. The method of claim 2 wherein said visible indication comprises flashing alternating lights.

6. The method of claim 2 wherein said visible indication comprises providing a rotating light.

7. The method of claim 1 further including generating illumination at least in part in response to said sensed voltage fluctuations.

8. The method of claim 1 further including selectively interrupting at least one connection between said power bus and at least one additional load to reduce noise on said power line during data transmission.

9. The method of claim 1 wherein said modulating includes pulse width modulating said current load.

10. The method of claim 1 wherein said modulating includes frequency modulating said current load.

11. The method of claim 1 wherein said modulating includes phase shift modulating said current load.

12. The method of claim 1 wherein said modulating includes frequency shift key modulating said current load.

13. The method of claim 1 wherein said sensing comprises deriving at least some characteristics of said information signal from said sensed voltage fluctuations.

14. The method of claim 1 wherein said sensing is performed at a node on said power bus that is remote from said power source.

15. The method of claim 1 further including producing said information signal, at least in part in response to user manipulation of at least one user-manipulable control.

16. The method of claim 1 wherein said modulating includes modulating said current load with at least one of a square, sine, triangle or saw tooth wave.

17. In a vehicle including a finite power source connected to a power bus, a method of using said power bus to communicate control signaling to a device mounted on said vehicle, said method comprising:
    using an information signal to modulate a current sink coupled to said power source at least in part in response to a control signal, said modulated current sink inducing voltage fluctuations at said power source that are in response to said information signal;
    sensing said voltage fluctuations on said power bus; and
    demodulating said sensed voltage fluctuations to recover said information signal,
    wherein said causing step comprises causing said battery type power supply to act as a power-reactive voltage mirror of induced modulation.

18. The method of claim 1 further including increasing signal to noise ratio by intermittently removing at least some current-drawing loads from said power bus.

19. In a vehicle including a finite power source connected to a power bus, a method of using said power bus to communicate power and control signaling to a device mounted on said vehicle, said method comprising:
    means coupled to a power bus for using an information signal to modulate a current load at least in part in response to a control signal, said modulated current load inducing voltage fluctuations that are at least in part in response to said information signal, to thereby cause said power source to act as a power-reactive voltage mirror of induced modulation;
    means coupled to said power bus for sensing said voltage fluctuations on said power bus; and
    means coupled to said sensing means for demodulating said sensed voltage fluctuations to recover said information signal.

20. A method of using a power source connected to a power bus to communicate power and information to a device coupled to said power bus, said method comprising:
    using an information signal to modulate a current load coupled to said power source, said modulated current load inducing voltage fluctuations that are in response to said information signal, to thereby cause said power source to act as a power-reactive voltage mirror of induced modulation;
    sensing said voltage fluctuations on said power bus; and
    demodulating said sensed voltage fluctuations to recover said information signal.

21. In a vehicle of the type including at least one substantially resistive electrical load switchably connected to a power bus, a method of communicating information within said vehicle comprising:

controllably disconnecting said substantially resistive load from said power bus at least in part in response to an information signal, thereby inducing voltage fluctuations on said power bus;

selectively and temporarily decoupling at least one additional load from said power bus during induction of at least some of said voltage fluctuations, thereby reducing noise present on said power bus while said power bus is being used for data communications; and capturing and demodulating said voltage fluctuations to at least in part recover said information signal.

22. The method of claim 21 wherein said substantially resistive load comprises a current modulated load.

23. The method of claim 21 wherein a battery is connected to supply current to said power bus, and disconnection of said substantially resistive load causes the battery to modulate its voltage output in a way that is responsive to the current drawn by the switched resistive load.

24. The method of claim 21 further including a power source connected ot said power bus, and wherein said load switching causes said power source to act as a power-reactive voltage mirror of induced modulation.

25. The method of claim 21 wherein said additional load comprises at least one noisy load that induces noise on said power bus during operation of said noisy load.

26. The method of claim 21 wherein said additional load, when operating, generates a humanly perceivable indication, and said decoupling disconnects said additional load from said power bus in a way so as not to substantially impact human perception of said indication.

* * * * *